(12) United States Patent
O

(10) Patent No.: US 10,057,438 B2
(45) Date of Patent: Aug. 21, 2018

(54) IMAGE FORMING APPARATUS AND METHOD OF CONTROLLING IMAGE FORMING APPARATUS

(71) Applicant: KYOCERA Document Solutions Inc., Osaka (JP)

(72) Inventor: Kin O, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/680,772

(22) Filed: Aug. 18, 2017

(65) Prior Publication Data

US 2018/0069973 A1    Mar. 8, 2018

(30) Foreign Application Priority Data

Sep. 2, 2016   (JP) .................. 2016-172031

(51) Int. Cl.
*H04N 1/00*   (2006.01)

(52) U.S. Cl.
CPC ....... *H04N 1/00469* (2013.01); *H04N 1/0044* (2013.01); *H04N 1/00411* (2013.01); *H04N 1/00708* (2013.01); *H04N 1/00737* (2013.01); *H04N 1/00779* (2013.01); *H04N 2201/0094* (2013.01)

(58) Field of Classification Search
CPC ........... H04N 1/00469; H04N 1/00737; H04N 1/00708; H04N 1/0044; H04N 1/00779; H04N 1/00411; H04N 2201/0094
See application file for complete search history.

(56) References Cited

U.S. PATENT DOCUMENTS

| 2006/0132821 | A1* | 6/2006 | Nonaka | H04N 1/00127 358/1.13 |
| 2009/0237712 | A1* | 9/2009 | Shirai | H04N 1/2384 358/1.15 |
| 2013/0107284 | A1* | 5/2013 | Hayashi | G06K 15/00 358/1.2 |
| 2016/0042496 | A1* | 2/2016 | Ichimi | G06T 3/40 345/671 |

FOREIGN PATENT DOCUMENTS

JP    2006-238106 A    9/2006

* cited by examiner

*Primary Examiner* — Kent Yip
(74) *Attorney, Agent, or Firm* — Stein IP, LLC

(57) ABSTRACT

An image forming apparatus includes an operation display portion, an image reading portion which reads a reading region including an original document so as to generate image data and a control portion which generates basic display data for displaying an image in all parts of the reading region including an original document image. When the size of the original document is a threshold value or more smaller than the size of the reading region, the control portion generates enlargement display data for displaying the original document image whose display size is enlarged as compared with the original document image displayed based on the basic display data and makes the operation display portion produce the display based on the enlargement display data.

8 Claims, 8 Drawing Sheets

FIG.6
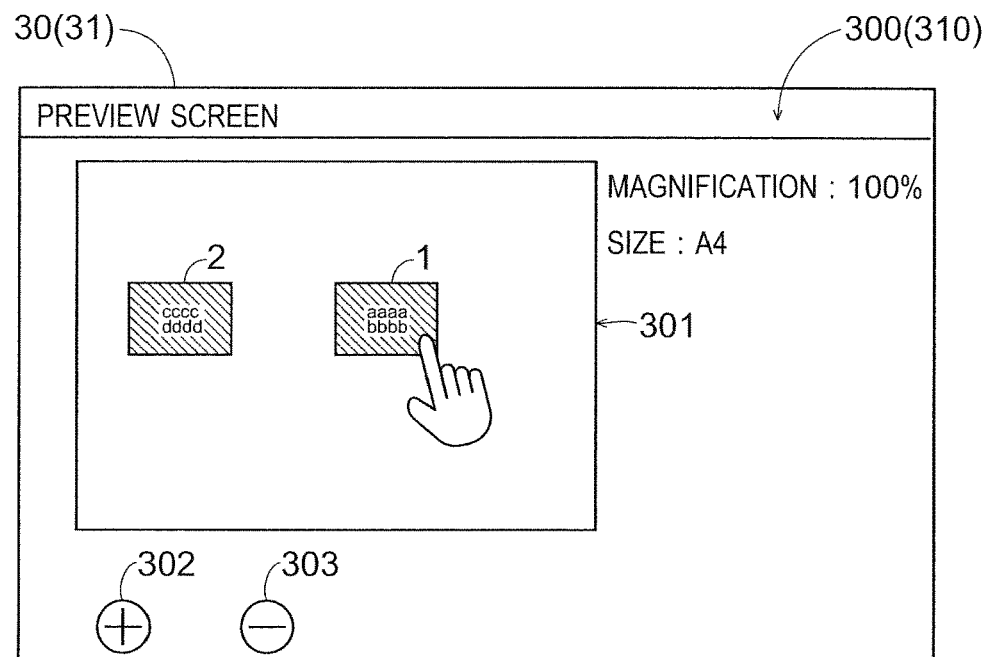
SPECIFICATION OPERATION DETECTED
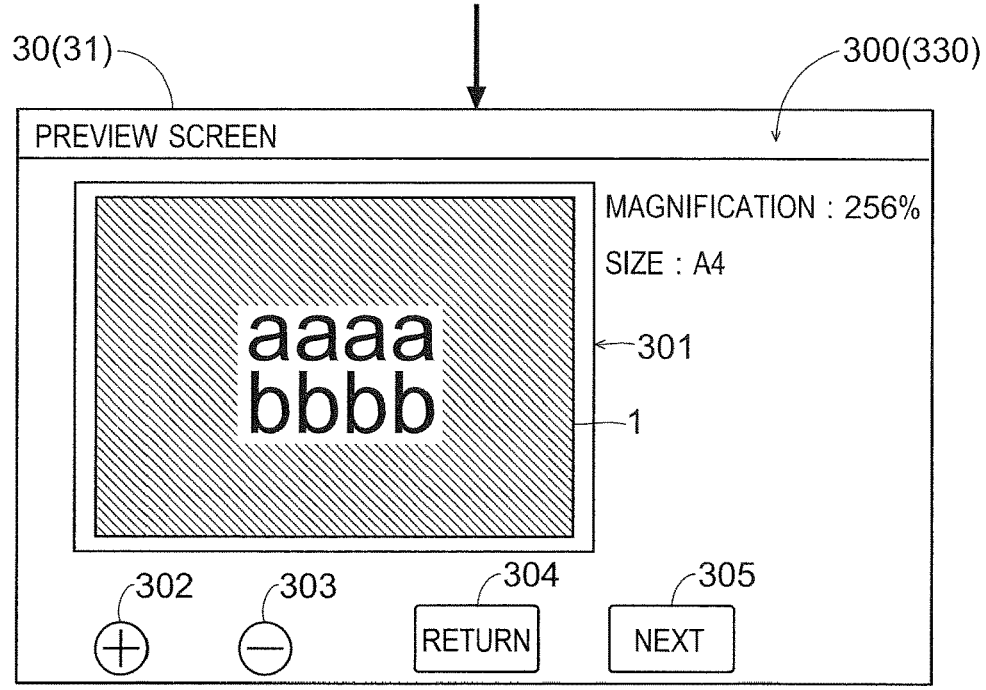

IMAGE FORMING APPARATUS AND METHOD OF CONTROLLING IMAGE FORMING APPARATUS

INCORPORATION BY REFERENCE

This application is based upon and claims the benefit of priority from the corresponding Japanese Patent Application No. 2016-172031 filed on Sep. 2, 2016, the entire contents of which are incorporated herein by reference.

BACKGROUND

The present disclosure relates to an image forming apparatus which can perform a job involving the reading of an original document and a method of controlling such an image forming apparatus.

In an image forming apparatus such as a multifunctional machine, an image reading portion is included which reads an original document so as to generate image data on the original document. When the image forming apparatus including the image reading portion is used, a job involving the reading of the original document (for example, a copy job for printing an image read by the image reading portion) can be performed.

The image forming apparatus including the image reading portion may have a preview function which is the function of producing, on an operation display portion, a preview display of the image read by the image reading portion.

SUMMARY

An image forming apparatus according to a first aspect of the present disclosure includes an operation display portion, an image reading portion and a control portion. The operation display portion receives an operation from a user and displays a screen including a preview region. The image reading portion reads a reading region including an original document so as to generate image data on the reading region. The control portion generates, based on the image data on the reading region generated by the image reading portion, basic display data for producing, in the preview region, a preview display of an image in all parts of the reading region including an original document image of the original document. The control portion detects a size of the original document based on the image data on the reading region, and determines whether or not the size of the original document is a predetermined threshold value or more smaller than a size of the reading region, and when the control portion determines that the size of the original document is the threshold value or more smaller than the size of the reading region, the control portion generates enlargement display data for producing, in the preview region, a preview display of the original document image whose display size is enlarged as compared with the original document image produced as the preview display in the preview region based on the basic display data and makes the operation display portion produce the preview display based on the enlargement display data.

A method of controlling an image forming apparatus according to a second aspect of the present disclosure is a method of controlling an image forming apparatus which displays a screen including a preview region, and includes: a step of reading a reading region including an original document so as to generate image data on the reading region; a step of generating, based on the image data on the reading region, basic display data for producing, in the preview region, a preview display of an image in all parts of the reading region including an original document image of the original document; and a step of detecting a size of the original document based on the image data on the reading region, determining whether or not the size of the original document is a predetermined threshold value or more smaller than a size of the reading region, generating, when determining that the size of the original document is the threshold value or more smaller than the size of the reading region, enlargement display data for producing, in the preview region, a preview display of the original document image whose display size is enlarged as compared with the original document image produced as the preview display in the preview region based on the basic display data and producing the preview display based on the enlargement display data.

BRIEF DESCRIPTION OF THE DRAWINGS

FIG. 6 is a diagram showing the transition of the preview screen displayed by the multifunctional machine according to the embodiment of the present disclosure (diagram showing the transition of the screen when a specification operation is detected);

DETAILED DESCRIPTION

<Configuration of Multifunctional Machine>

Figure 1:
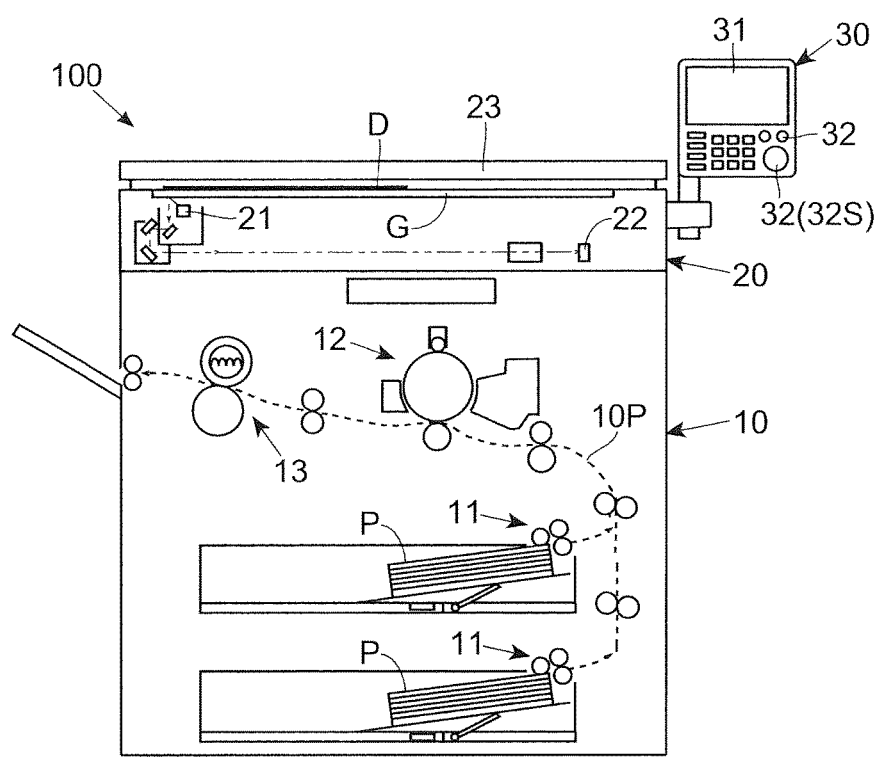
FIG. 1 is a diagram showing the overall configuration of a multifunctional machine according to an embodiment of the present disclosure.

As shown in FIG. 1, the multifunctional machine 100 (which corresponds to an "image forming apparatus") of the present embodiment includes a print portion 10. The print portion 10 corresponds to a "job performance portion".

The print portion 10 transports a sheet P along a sheet transport path 10P. The print portion 10 forms a toner image corresponding to an image to be printed. Then, the print portion 10 prints the toner image on the sheet P which is being transported. For example, the print portion 10 is formed with a paper feed portion 11 which feeds the sheet P stored in a sheet cassette to the sheet transport path 10P, an image formation portion 12 which forms the toner image and transfers it to the sheet P, a fixing portion 13 which fixes, to the sheet P, the toner image transferred to the sheet P and the like.

The multifunctional machine 100 also includes an image reading portion 20. The image reading portion 20 includes a lamp 21, an image sensor 22 and the like so as to optically read an original document D. The lamp 21, the image sensor 22 and the like are stored within the housing (reading housing) of the image reading portion 20. On the upper surface of the reading housing, contact glass G on which the original document D to be read is placed is provided. In order to reduce the floating of the original document D placed on the contact glass G, an original document holding plate 23 is attached such that the original document holding plate 23 can be opened and closed with respect to the upper surface of the reading housing.

In a job (such as a copy job) involving the reading of the original document D, the original document D is placed on the contact glass G by a user. Then, the image reading portion 20 reads a reading region which includes the original document D placed on the contact glass G so as to generate image data on the reading region that is read.

The multifunctional machine 100 also includes an operation panel 30. The operation panel 30 corresponds to an "operation display portion".

The operation panel 30 includes a touch panel display 31. The touch panel display 31 displays a screen in which software keys and the like are arranged. The touch panel display 31 receives, from the user, a reduction operation, a specification operation and the like which will be described later. In the operation panel 30, a plurality of hardware keys 32 are provided. Examples of the hardware key 32 include a start button 32S for receiving, from the user, an instruction operation for instructing the multifunctional machine 100 to perform a job.

Figure 2:
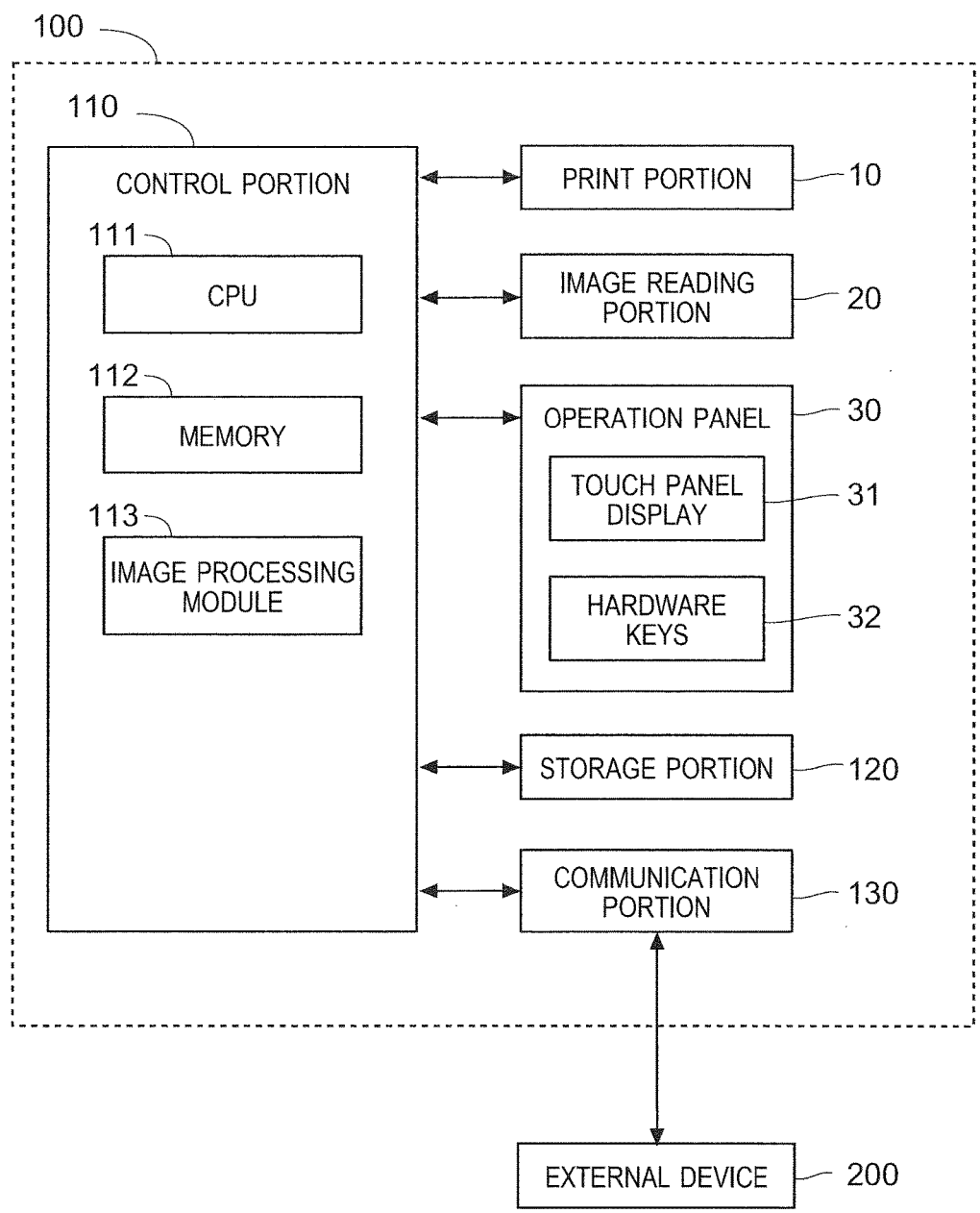
FIG. 2 is a diagram showing the hardware configuration of the multifunctional machine according to the embodiment of the present disclosure.

As shown in FIG. 2, the multifunctional machine 100 includes a control portion 110, a storage portion 120 and a communication portion 130.

The control portion 110 is connected to the print portion 10 so as to control the print operation of the print portion 10. The control portion 110 is also connected to the image reading portion 20 so as to control the reading operation of the image reading portion 20. Furthermore, the control portion 110 is connected to the operation panel 30. The control portion 110 controls the display operation of the touch panel display 31 and detects a touch operation on the touch panel display 31 (the software keys) and a press-down operation on the hardware keys 32.

The control portion 110 includes a CPU 111, a memory 112 and an image processing module 113. The CPU 111 performs, based on control programs and data, processing for controlling the multifunctional machine 100. The memory 112 stores the control programs and data for operating the CPU 111.

The image processing module 113 includes a circuit for image processing and a memory. For example, when a job involving the reading of the original document D (job using the image data on the reading region generated by the image reading portion 20) is performed, the image data on the reading region generated by the image reading portion 20 is transferred to the memory 112 and is temporarily stored. Then, when the job to be performed is a copy job, the image processing module 113 performs image processing on the image data on the reading region so as to generate exposure data for controlling exposure processing (processing for forming an electrostatic latent image corresponding to the image to be printed) which is performed in the image formation portion 12.

The image processing module 113 also generates display data (basic display data and enlargement display data which will be described later) for producing a preview display of the image read by the image reading portion 20. For example, in order to generate the display data for preview display, a dedicated circuit is provided in the image processing module 113.

The storage portion 120 includes a nonvolatile storage device such as a ROM (EEPROM or the like) or a HDD. The control portion 110 is connected to the storage portion 120 so as to read data from the storage portion 120 and write data in the storage portion 120.

The communication portion 130 includes a communication circuit, a memory and a communication connector. The control portion 110 is connected to the communication portion 130 so as to communicate with an external device 200 through the communication portion 130. For example, a personal computer, a facsimile device and the like are connected to the multifunctional machine 100 such that they can communicate with the multifunctional machine 100. When the external device 200 is connected to the multifunctional machine 100 such that the external device 200 can communicate with the multifunctional machine 100, a transmission job for transmitting, to the external device 200, data including the image read by the multifunctional machine 100 (the image reading portion 20) can be performed.

<Size Setting for Reading Region>

When the job involving the reading of the original document D (the job using the image data on the reading region generated by the image reading portion 20) is performed, the control portion 110 makes the operation panel 30 receive a condition setting for setting job performance conditions. For example, the operation panel 30 receives a setting for the size (hereinafter also referred to as a reading size) of the reading region which is read by the image reading portion 20.

When the setting of the reading size is performed by the user, for example, a plurality of sizes (such as A4 size and B5 size) are displayed as choices on the operation panel 30. Then, the operation panel 30 receives a selection operation for selecting a size specified by the user from a plurality of sizes displayed as the choices.

When the control portion 110 detects that the selection operation is performed on the operation panel 30, the control portion 110 sets the size (size specified by the user) selected by the selection operation to the reading size. When the job to be performed is the copy job, the control portion 110 sets the size selected by the selection operation to the size of the sheet P which is used in the job.

Then, when the job involving the reading of the original document D is performed, the control portion 110 makes the image reading portion 20 performs reading such that the reading size is the size specified by the user. Thereafter, when the job to be performed is the copy job, the control portion 110 makes the print portion 10 perform printing based on the image data on the reading region generated by the image reading portion 20. Here, the print portion 10 transports the sheet P of the size selected by the selection operation, and prints, on the sheet P being transported, the image (the image of the original document D) in the reading region read by the image reading portion 20. In other words, the print portion 10 outputs the page (the sheet P) on which the image of the original document D is arranged.

<Preview Display by Operation Panel>

The multifunctional machine 100 has a preview function, an on/off setting for the preview function is set on and thus the preview function can be used. The reception of an operation for setting the on and off of the preview function is performed by the operation panel 30.

For example, when in the copy job, the on/off setting for the preview function is set off, the image reading portion 20 reads the image in the reading region, and then the control portion 110 makes the print portion 10 print the image in the reading region.

On the other hand, when in the copy job, the on/off setting for the preview function is set on, the image reading portion 20 reads the image in the reading region, and thereafter the control portion 110 makes the operation panel 30 produce a preview display of the image in the reading region read by the image reading portion 20 before the printing is performed by the print portion 10. Thereafter, when the control portion 110 detects that the press-down operation is performed on the start button 32S on the operation panel 30, the control portion 110 makes the print portion 10 print the image in the reading region.

Figure 3:
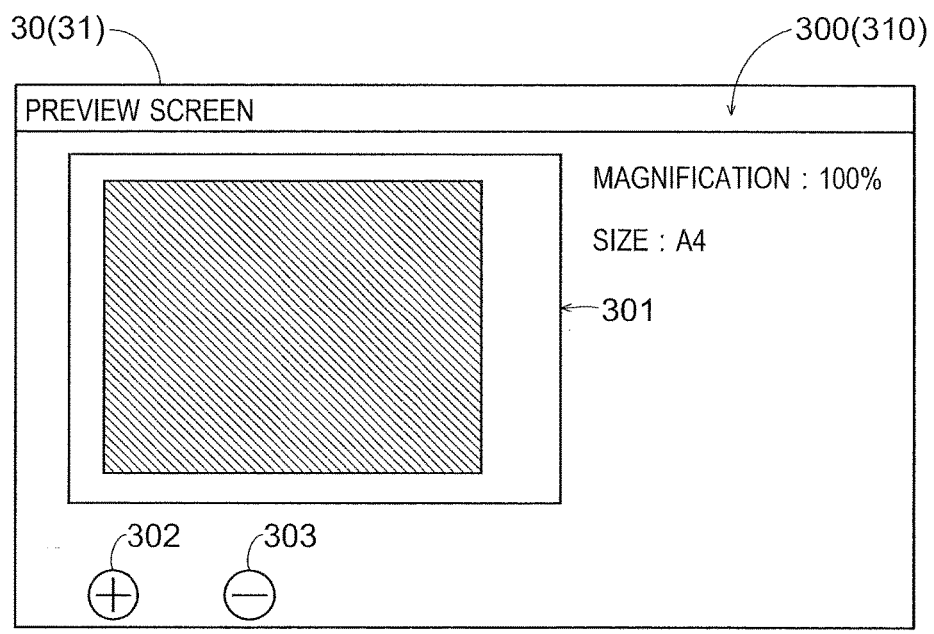
FIG. 3 is a diagram showing a preview screen displayed by the multifunctional machine according to the embodiment of the present disclosure.

When the control portion 110 makes the operation panel 30 produce a preview display, the control portion 110 makes the operation panel 30 display a preview screen 300 (310) as shown in FIG. 3. In the preview screen 310, a preview region 301 for producing a preview display of the image in the reading region read by the image reading portion 20 is provided. The aspect ratio of the preview region 301 is the same as that of the reading region (the reading size). For example, when the reading size is set to the A4 size, the aspect ratio of the preview region 301 is the aspect ratio of the A4 size. When the reading size is set to the B5 size, the aspect ratio of the preview region 301 is the aspect ratio of the B5 size. In other words, the aspect ratio of the preview region 301 is changed according to the reading size.

When the control portion 110 makes the operation panel 30 produce a preview display, the control portion 110 generates, based on the image data on the reading region generated by the image reading portion 20, the basic display data for producing, in the preview region 301, a preview display of an image in all parts of the reading region including the image of the original document D. In FIG. 3, in a preview image which is produced as the preview display in the preview region 301, the image of the original document D is hatched. In FIGS. 4 to 8 referenced in the following description, the image of the original document D produced as the preview display in the preview region 301 is also hatched.

Then, the control portion 110 makes the operation panel 30 produce the preview display based on the basic display data (the image in all parts of the reading region including the image of the original document D is displayed in the preview region 301). For example, when the reading size is set to the A4 size, and the original document D which is smaller than the A4 size is read, as shown in FIG. 3, the display size of the image of the original document D is smaller than the display size of the preview region 301. In another example, when the reading size is set to the A4 size, and the original document D of the A4 size is read, though not shown in the figure, the display size of the image of the original document D is the same as the display size of the preview region 301 (the entire preview region 301 is the image of the original document D).

In the preview screen 310, an enlargement button 302 for receiving an instruction from the user to enlarge the display size of the image of the original document D produced as the preview display in the preview region 301 is arranged, and a reduction button 303 for receiving an instruction from the user to reduce the display size of the image of the original document D produced as the preview display in the preview region 301 is arranged.

Figure 4:
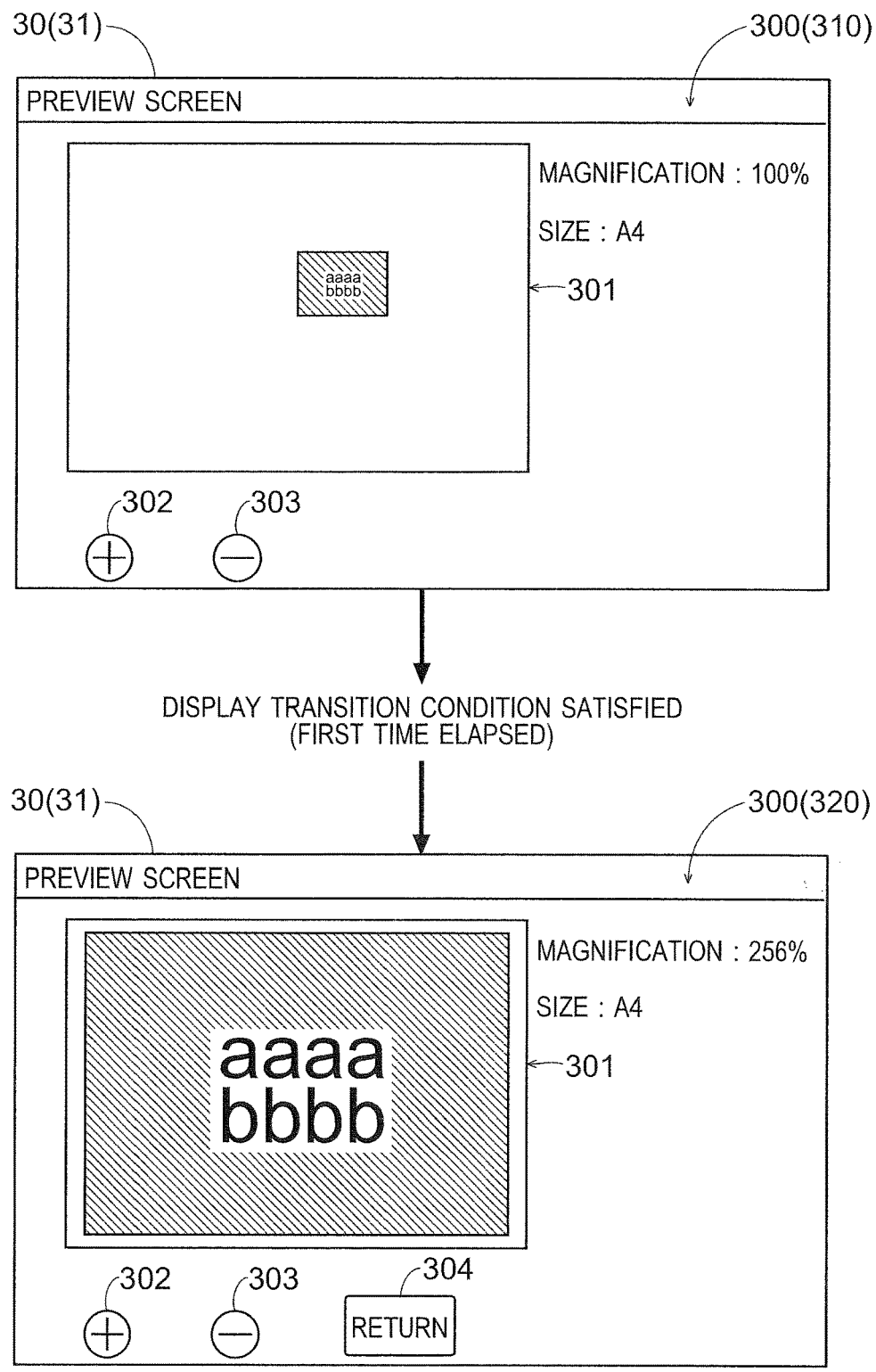
FIG. 4 is a diagram showing the transition of the preview screen displayed by the multifunctional machine according to the embodiment of the present disclosure (diagram showing the transition of the screen when a display transition condition is satisfied)

As shown in the upper diagram of FIG. 4, when the size of the original document D is small for the reading size (for example, when a card original document D such as an identification card is read), the display size of the image of the original document D produced as the preview display in the preview region 301 is small. Hence, it is difficult to confirm the image of the original document D, and thus convenience for the user is lowered. For example, when the size of the original document D is equal to or less than 50% of the reading size, it is difficult to confirm the image of the original document D produced as the preview display in the preview region 301.

Hence, the control portion 110 recognizes the size of the reading region read by the image reading portion 20. The control portion 110 also performs, based on the image data on the reading region, original document size detection for detecting the size of the original document D (original document D placed on the contact glass G by the user) read by the image reading portion 20. In the original document size detection, the lengths of the original document D in a main scanning direction and a sub scanning direction are detected.

For example, the control portion 110 performs edge detection processing or the like so as to detect edges from the image data on the reading region. Then, the control portion 110 recognizes, as the image of the original document D, an image corresponding to a region surrounded by the detection edges detected in the edge detection processing, and detects, as the size of the original document D, the size of the region surrounded by the detection edges.

Thereafter, the control portion 110 determines whether or not the size of the original document D is a predetermined threshold value or more smaller than the reading size. Consequently, when the size of the original document D is the threshold value or more smaller than the reading size, the control portion 110 determines that an enlargement condition is satisfied so as to perform enlargement processing. For example, when the size of the original document D is 50% or more smaller than the reading size, the control portion 110 determines that the enlargement condition is satisfied. In other words, the threshold value is 50%.

The control portion 110 generates, as the enlargement processing, based on the basic display data, the enlargement display data for producing, in the preview region 301, a preview display of an image of the original document D whose display size is enlarged as compared with the image of the original document D produced as the preview display in the preview region 301. For example, the control portion 110 generates the enlargement display data such that the center of the image of the original document D which is enlarged and displayed is arranged in the center of the preview region 301. The control portion 110 enlarges the display size of the image of the original document D such that the display size is within the preview region 301. Then, after the generation of the enlargement display data, the control portion 110 makes the operation panel 30 produce the preview display based on the enlargement display data.

Here, the display size of the image of the original document D may be enlarged to the maximum size which is within the preview region 301. The display size of the image of the original document D may also be enlarged such that a ratio of the display size of the image of the original document D to the display size of the preview region 301 is within a predetermined range. The display size of the image of the original document D may also be enlarged so as to be a predetermined percent (for example, several to several tens of percent) smaller than the display size of the preview region 301.

When the operation panel 30 produces the preview display based on the enlargement display data, the operation panel 30 displays a preview screen 300 (320) as shown in the lower diagram of FIG. 4. As in the preview screen 310, in the preview screen 320, the preview region 301, the enlargement button 302 and the reduction button 303 are arranged. Then, the operation panel 30 enlarges and displays the image of the original document D in the preview region 301 of the preview screen 320. In the preview screen 320, a return button 304 is additionally arranged.

For example, the preview display based on the enlargement display data is produced after the preview display based on the basic display data. Specifically, as shown in FIG. 4, after the image reading portion 20 reads the image in the reading region, regardless of whether the size of the original document D is the threshold value or more smaller than the reading size, the control portion 110 makes the operation panel 30 produce the preview display based on the basic display data (makes the operation panel 30 display the preview screen 310).

Thereafter, the control portion 110 determines whether or not a predetermined display transition condition is satisfied, and when the control portion 110 determines that the display transition condition is satisfied, the control portion 110 makes the operation panel 30 produce the preview display based on the enlargement display data (makes the operation panel 30 display the preview screen 320). In other words, the operation panel 30 transitions from the preview display based on the basic display data to the preview display based on the enlargement display data. When the control portion 110 determines that the display transition condition is not satisfied, the operation panel 30 continues the preview display based on the basic display data (the preview display based on the enlargement display data is not produced).

When a first time (predetermined time) has elapsed since the start of the preview display based on the basic display data, the control portion 110 determines that the display transition condition is satisfied, and thus the control portion 110 makes the operation panel 30 start the preview display based on the enlargement display data. For example, the first time is several seconds (for example, 2 seconds).

When the operation panel 30 displays (produces the preview display based on the enlargement display data) the preview screen 320, the control portion 110 determines whether or not a predetermined display restoration condition is satisfied.

Figure 5:
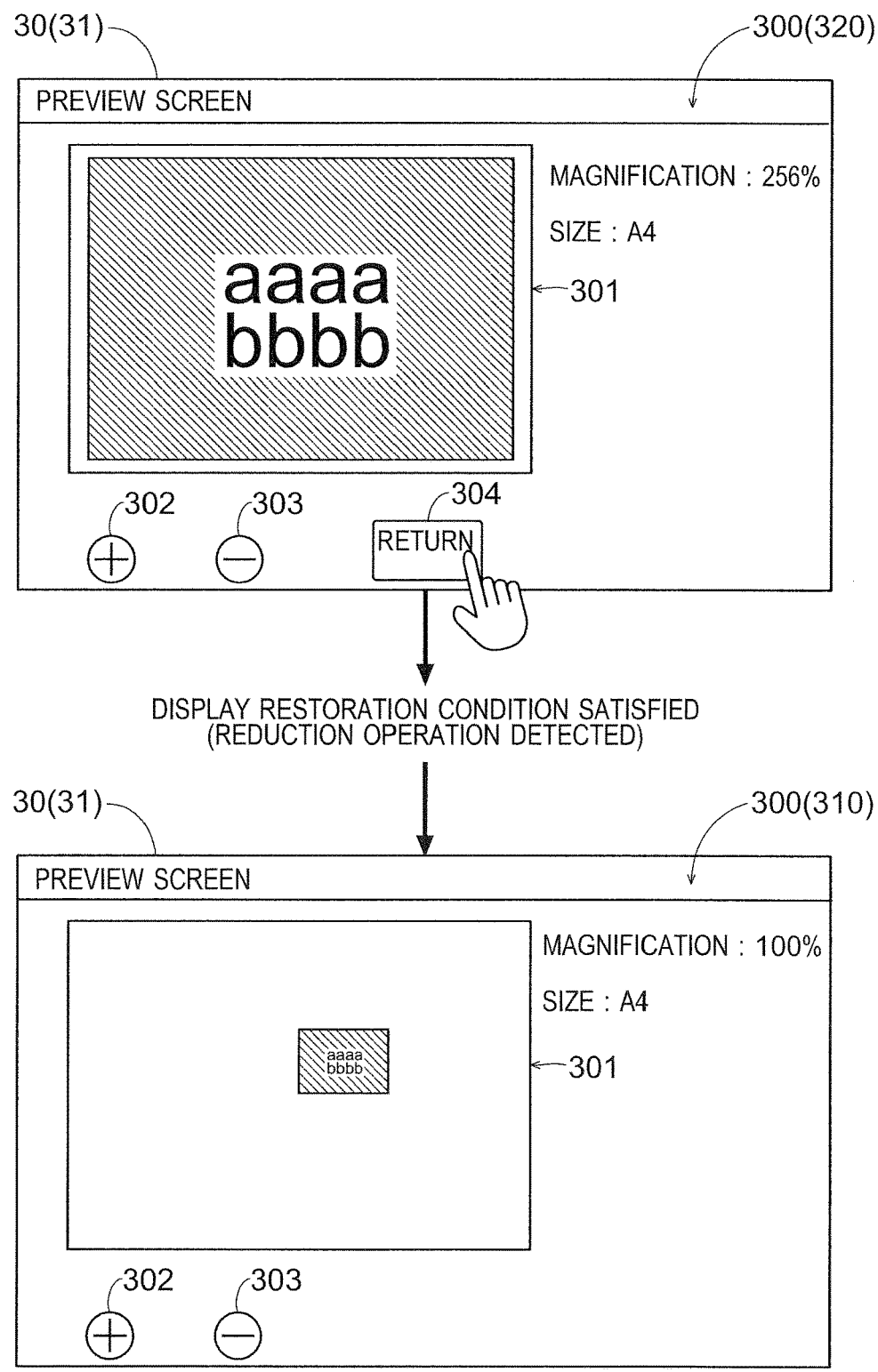
FIG. 5 is a diagram showing the transition of the preview screen displayed by the multifunctional machine according to the embodiment of the present disclosure (diagram showing the transition of the screen when a display restoration condition is satisfied)

Then, as shown in FIG. 5, when the control portion 110 determines that the display restoration condition is satisfied, the control portion 110 makes the operation panel 30 produce the preview display based on the basic display data (makes the operation panel 30 display the preview screen 310). In other words, the operation panel 30 transitions from the preview display based on the enlargement display data to the preview display based on the basic display data. When the control portion 110 determines that the display restoration condition is not satisfied, the operation panel 30 continues the preview display based on the enlargement display data (the preview display based on the basic display data is not produced).

For example, when the operation panel 30 produces the preview display based on the enlargement display data, the control portion 110 makes the operation panel 30 receive the predetermined reduction operation. Here, the operation panel 30 receives, as the reduction operation, a touch operation on the return button 304 in the preview screen 320.

Then, when the control portion 110 detects that the reduction operation is performed on the operation panel 30, the control portion 110 determines that the display restoration condition is satisfied. When a second time has elapsed since the start of the preview display based on the enlargement display data, the control portion 110 may also determine that the display transition condition is satisfied. Although there is no particular limitation, the second time is equal to or more than the first time (for example, several to several tens of seconds).

In some cases, in a state where a plurality of original documents D are placed on the contact glass G, the image reading portion 20 reads the original documents D. In other words, in the image in the reading region obtained by the reading with the image reading portion 20, a plurality of images of the original documents D may be included.

In this case, as shown in the upper diagram of FIG. 6, the control portion 110 generates, as the basic display data, data for producing, in the preview region 301, a preview display of an image in all parts of the reading region including the images of the original documents D, and makes the operation panel 30 produce the preview display based on the generated basic display data (makes the operation panel 30 display the preview screen 310). In other words, the preview display of the images of the original documents D is produced in the preview region 301 of the preview screen 310.

The control portion 110 also makes the operation panel 30 receive the specification operation for specifying any one of the images of the original documents D. For example, the operation panel 30 receives, as the specification operation, a touch operation of touching any one of the display regions of the images of the original documents D produced as the preview display in the preview region 301. In other words, among the images of the original documents D produced as the preview display in the preview region 301, the image of the original document D whose display region is touched is the image of the original document D specified by the user. FIG. 6 shows, as an example, a case where the image of the original document D identified with a symbol of "1" is specified.

When the control portion 110 detects that the specification operation is performed on the operation panel 30, the control portion 110 sets, to a target image, the image specified by the specification operation among the images of the original documents D produced as the preview display. Then, the control portion 110 generates, as the enlargement display data, data for producing, in the preview region 301, a preview display of a target image whose display size is enlarged as compared with the target image produced as the preview display in the preview region 301 based on the basic display data, and makes the operation panel 30 produce the preview display based on the generated enlargement display data.

Here, the operation panel 30 displays a preview screen 300 (330) as shown in the lower diagram of FIG. 6. As in the preview screen 320, in the preview screen 330, the preview region 301, the enlargement button 302, the reduction button 303 and the return button 304 are provided. Then, the operation panel 30 enlarges and displays the target image in the preview region 301 of the preview screen 330. In the preview screen 330, a next button 305 is additionally arranged.

When the operation panel 30 displays (produces the preview display based on the enlargement display data) the preview screen 330, the control portion 110 makes the operation panel 30 receive a predetermined switching operation. Here, the operation panel 30 receives, as the switching operation, a touch operation on the next button 305 in the preview screen 330.

Figure 7:
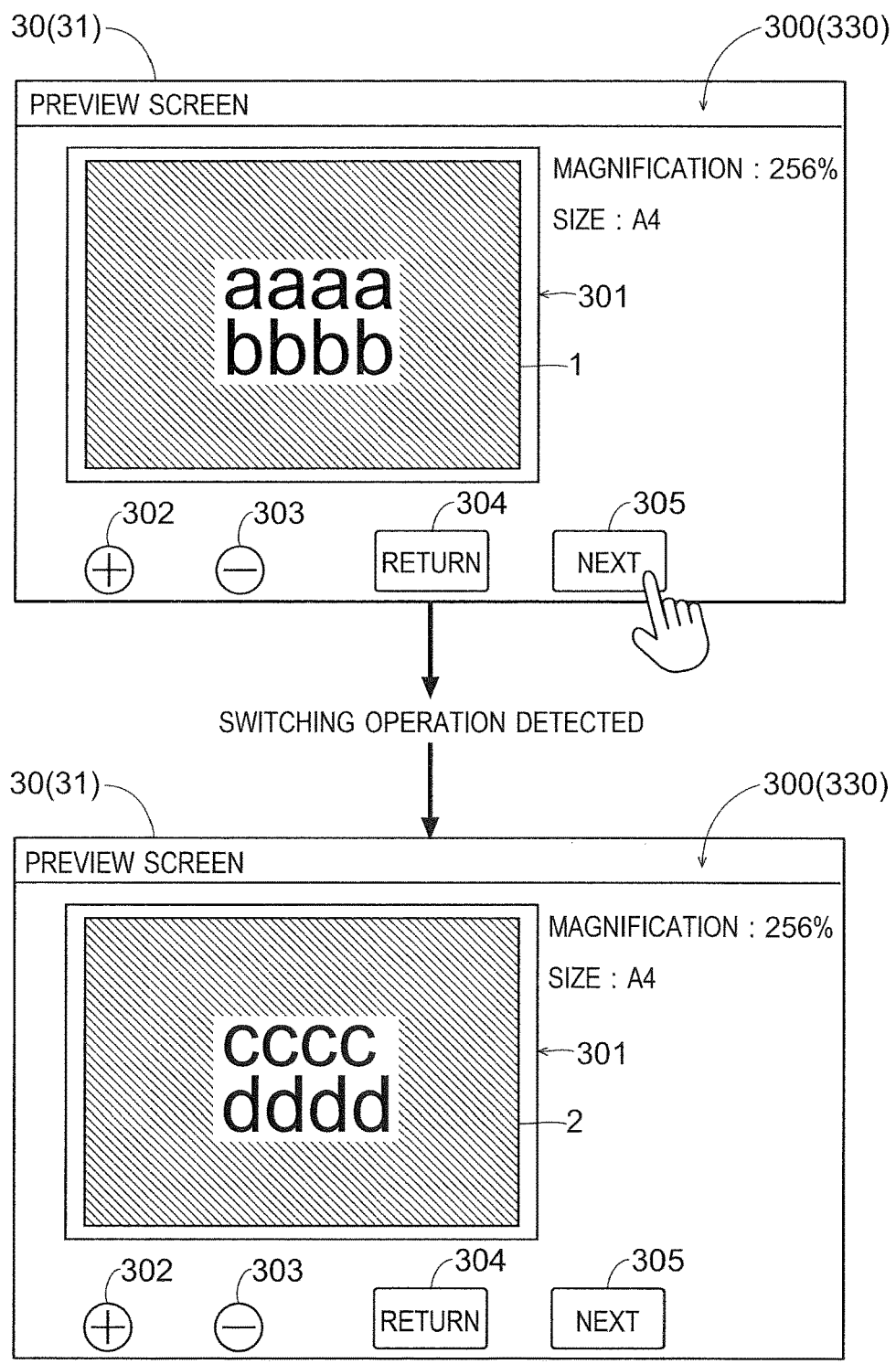
FIG. 7 is a diagram showing the transition of the preview screen displayed by the multifunctional machine according to the embodiment of the present disclosure (diagram showing the transition of the screen when a switching operation is detected)

Then, as shown in FIG. 7, when the control portion 110 detects that the switching operation is performed on the operation panel 30, the control portion 110 sets, to a new target image, any one of the images which are not enlarged and displayed among the images of the original documents D. Then, the control portion 110 generates, as the enlargement display data, data for enlarging and displaying the newly set target image, and makes the operation panel 30 produce a preview display based on the generated enlargement display data. In the example shown in FIG. 7, since among the images of the original documents D shown in FIG. 6, the image identified with the symbol of "1" has already been enlarged and displayed, the image which is subsequently enlarged and displayed in the preview region 301 is the image identified with a symbol of "2" (the image is set to the target image).

Figure 8:
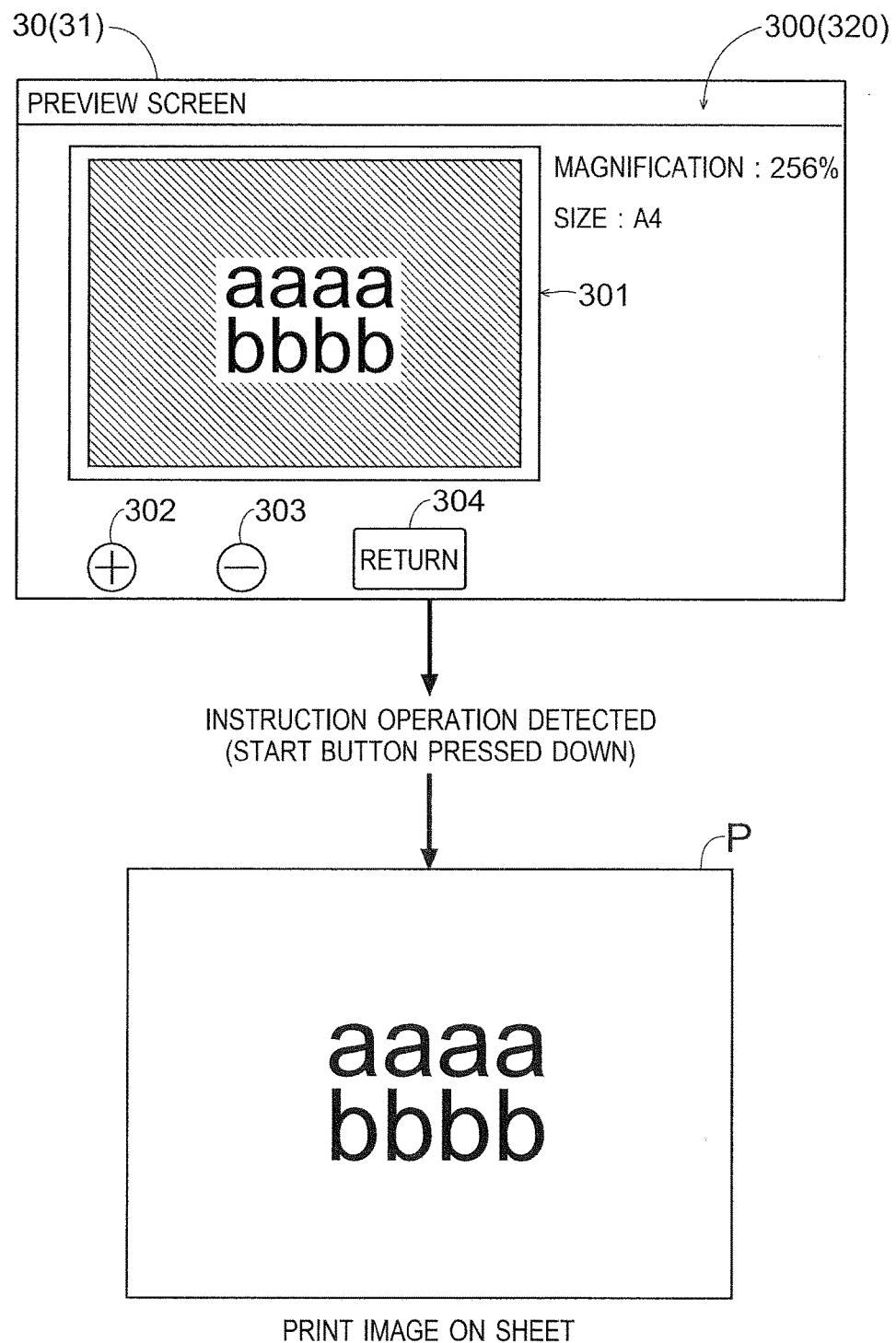
FIG. 8 is a diagram showing processing performed when the multifunctional machine according to the embodiment of the present disclosure receives an instruction operation for instructing the multifunctional machine to perform a job while the preview display is displayed.

Here, as shown in FIG. 8, while the operation panel 30 produces the preview display based on the enlargement display data (when the operation panel 30 displays the preview screen 320 or the preview screen 330), when the control portion 110 detects the press-down operation (the instruction operation for instructing the multifunctional machine 100 to perform a job) on the start button 32S in the operation panel 30, the control portion 110 sets, to a target size ratio, a size ratio between the image of the original document D produced as the preview display in the preview region 301 based on the enlargement display data and the preview region 301. Then, the control portion 110 makes the print portion 10 perform the job such that the size ratio between the image of the original document D arranged on an output page and the output page is the target size ratio. For example, when the job to be performed is the copy job, the print portion 10 forms a toner image corresponding to the image of the original document D such that a size ratio between the image of the original document D printed on the sheet P used in the job and the size of the sheet P used in the job is the target size ratio, and prints the toner image on the sheet P.

As described above, the multifunctional machine 100 (image forming apparatus) of the present embodiment includes: the operation panel 30 (operation display portion) which receives an operation from the user and which displays the preview screen 300 (screen) including the preview region 301; the image reading portion 20 which reads the reading region including the original document D so as to generate the image data on the reading region; and the control portion 110 (including the image processing module 113) which generates, based on the image data on the reading region generated by the image reading portion 20, the basic display data for producing, in the preview region 301, a preview display of an image in all parts of the reading region including the image of the original document D. The control portion 110 detects the size of the original document D based on the image data on the reading region, and determines whether or not the size of the original document D is a predetermined threshold value or more smaller than the size of the reading region, and when the control portion 110 determines that the size of the original document D is the threshold value or more smaller than the size of the reading region, the control portion 110 generates the enlargement display data for producing, in the preview region 301, a preview display of the image of the original document D whose display size is enlarged as compared with the image of the original document D produced as the preview display in the preview region 301 based on the basic display data and makes the operation panel 30 produce the preview display based on the enlargement display data.

In the configuration of the present embodiment, when the image of the original document D produced as the preview display is small (when the size of the original document D is the threshold value or more smaller than the size of the reading region), the display size of the image of the original document D produced as the preview display is automatically enlarged. Hence, the user does not need to perform the enlargement operation for enlarging the display size of the image of the original document D produced as the preview display. Consequently, convenience for the user is enhanced. In this configuration, only when the size of the original document D is the threshold value or more smaller than the size of the reading region, the display size of the image of the original document D produced as the preview display is enlarged. In this way, the display size of the image of the original document D produced as the preview display is prevented from being unnecessarily enlarged.

In the present embodiment, as described above, when the operation panel 30 produces the preview display based on the enlargement display data, the operation panel 30 receives the predetermined reduction operation (the touch operation on the return button 304). When the control portion 110 detects that the reduction operation is performed on the operation panel 30, the control portion 110 makes the operation panel 30 produce the preview display based on the basic display data. In this way, the reduction operation is only performed once on the operation panel 30, and thus it is possible to simply return the display size of the image of the original document D produced as the preview display to the original display size (the display size before being enlarged), with the result that the operability is excellent.

In the present embodiment, as described above, when a predetermined time has elapsed since the start of the preview display based on the enlargement display data, the control portion 110 makes the operation panel 30 produce the preview display based on the basic display data. In this way, even when the user does not perform an operation on the operation panel 30, the display size of the image of the original document D produced as the preview display is returned to the original display size (the display size before being enlarged), with the result that the operability for the user is enhanced.

In the present embodiment, as described above, when an image in the reading region includes a plurality of images of the original documents D, the control portion 110 generates, as the basic display data, data for producing, in the preview region 301, a preview display of an image in all parts of the reading region including the images of the original documents, makes the operation panel 30 produce the preview display based on the generated basic display data and makes the operation panel 30 receive the specification operation (the touch operation on any one of the display regions of the images of the original documents D) for specifying any one of the images of the original documents D.

Then, when the control portion 110 detects that the specification operation is performed on the operation panel 30, the control portion 110 sets, to a target image, the image of the original document D specified by the specification operation among the images of the original documents D, generates, as the enlargement display data, data for producing, in the preview region 301, a preview display of the target image whose display size is enlarged as compared with the target image produced as the preview display in the preview region 301 based on the basic display data and makes the operation panel 30 produce the preview display based on the generated enlargement display data. In this way, even when the image in the reading region includes a plurality of images of the original documents D, only the image selected by the user among the images of the original documents D can be enlarged and displayed, with the result that the operability for the user is enhanced.

In the present embodiment, as described above, when the operation panel 30 produces the preview display based on the enlargement display data, the operation panel 30 receives the predetermined switching operation (the touch operation on the next button 305). Then, when the control portion 110 detects that the switching operation is performed on the operation panel 30, the control portion 110 sets, to a new target image, any one of the images which are not enlarged and displayed among the images of the original documents D so as to generate the enlargement display data and makes the operation panel 30 produce the preview display based on the generated enlargement display data. In this way, even when the image in the reading region read by the image reading portion 20 includes a plurality of images of the original documents D, only the switching operation is performed on the operation panel 30, and thus it is possible to simply enlarge and display the images of the original documents D one by one, with the result that the operability for the user is enhanced.

In the present embodiment, as described above, while the control portion 110 makes the operation panel 30 produce the preview display based on the enlargement display data, when the control portion 110 detects that the instruction operation (the press-down operation on the start button 32S) for instructing the multifunctional machine 100 to perform the job is performed on the operation panel 30, the control portion 110 sets, to the target size ratio, a size ratio between the image of the original document D produced as the preview display in the preview region 301 based on the enlargement display data and the preview region 301 and makes the print portion 10 perform the job such that a size ratio between the image of the original document D arranged on the page output by the print portion 10 and the page is the target size ratio. In this way, when the operation panel 30 produces the preview display based on the enlargement display data, the start button 32S is only pressed down, and thus it is possible to simply enlarge the image of the original document D printed on the sheet P, with the result that the operability for the user is enhanced.

The embodiment disclosed herein should be considered to be illustrative in all respects and not restrictive. The scope of the present disclosure is indicated not by the description of the above embodiment but by the scope of claims, and furthermore, meanings equivalent to the scope of claims and all modifications within the scope are included.

For example, although in the embodiment discussed above, the case where the job using the image data on the reading region is the copy job is described, the present disclosure can be applied to a case where the job using the image data on the reading region is the transmission job. In the transmission job, the transmission of data (page data on the page on which the image is arranged) including the image read by the image reading portion 20 to the external device 200 is performed by the communication portion 130. Hence, in this case, the communication portion 130 corresponds to the "job performance portion".

What is claimed is:

1. An image forming apparatus comprising:
an operation display portion which receives an operation from a user and which displays a screen including a preview region;
an image reading portion which reads a reading region including an original document so as to generate image data on the reading region; and
a control portion which generates, based on the image data on the reading region generated by the image reading portion, basic display data for producing, in the preview region, a preview display of an image in all parts of the reading region including an original document image of the original document,
wherein the control portion detects a size of the original document based on the image data on the reading region, and determines whether or not the size of the original document is a predetermined threshold value or more smaller than a size of the reading region, and
when the control portion determines that the size of the original document is the threshold value or more smaller than the size of the reading region, the control portion generates enlargement display data for producing, in the preview region, a preview display of the original document image whose display size is enlarged as compared with the original document image produced as the preview display in the preview region based on the basic display data and makes the operation display portion produce the preview display based on the enlargement display data,
an aspect ratio of the preview region is changed according to the size of the reading region,
wherein when, through reading by the image reading portion with a plurality of original documents placed on contact glass, an image in the reading region includes a plurality of the original document images, the control portion generates, as the basic display data, data for producing, in the preview region, a preview display of an image in the all parts of the reading region including the original document images, makes the operation display portion produce the preview display based on the generated basic display data and makes the operation display portion receive a specification operation for specifying any one of the original document images, and
when the control portion detects that the specification operation is performed on the operation display portion, the control portion sets, to a target image, the original document image specified by the specification operation among the original document images, generates, as the enlargement display data, data for producing, in the preview region, a preview display of the target image whose display size is enlarged as compared with the target image produced as the preview display in the preview region based on the basic display data and makes the operation display portion produce the preview display based on the generated enlargement display data.

2. The image forming apparatus according to claim 1, wherein when the operation display portion produces the preview display based on the enlargement display data, the operation display portion receives a predetermined reduction operation, and
when the control portion detects that the reduction operation is performed on the operation display portion, the control portion makes the operation display portion produce the preview display based on the basic display data.

3. The image forming apparatus according to claim 1, wherein when a predetermined time has elapsed since a start of the preview display based on the enlargement display data, the control portion makes the operation display portion produce the preview display based on the basic display data.

4. The image forming apparatus according to claim 1, wherein when the operation display portion produces the preview display based on the enlargement display data, the operation display portion receives a predetermined switching operation, and
when the control portion detects that the switching operation is performed on the operation display portion, the control portion sets, to the target image that is new, any one of the original document images which are not enlarged and displayed among the original document images so as to generate the enlargement display data and makes the operation display portion produce the preview display based on the generated enlargement display data.

5. The image forming apparatus according to claim 1, further comprising:
a job performance portion which outputs a page where the original document image is arranged when performing a job using the image data on the reading region,
wherein while the control portion makes the operation display portion produce the preview display based on the enlargement display data, when the control portion detects that an instruction operation for instructing the job performance portion to perform the job is performed on the operation display portion, the control portion sets, to a target size ratio, a size ratio between the original document image produced as the preview display in the preview region based on the enlargement display data and the preview region and makes the job performance portion perform the job such that a size ratio between the original document image arranged on the page and the page is the target size ratio.

6. The image forming apparatus according to claim 1, wherein the plurality of original documents are read simultaneously.

7. A method of controlling an image forming apparatus which displays a screen including a preview region, the method comprising:
a step of reading a reading region including an original document so as to generate image data on the reading region;
a step of generating, based on the image data on the reading region, basic display data for producing, in the preview region, a preview display of an image in all parts of the reading region including an original document image of the original document;
a step of detecting a size of the original document based on the image data on the reading region, determining whether or not the size of the original document is a predetermined threshold value or more smaller than a size of the reading region, generating, when determining that the size of the original document is the threshold value or more smaller than the size of the reading region, enlargement display data for producing, in the preview region, a preview display of the original document image whose display size is enlarged as compared with the original document image produced as the preview display in the preview region based on the basic display data and producing the preview display based on the enlargement display data;
a step of, when through reading by the image reading portion with a plurality of original documents placed on contact glass an image in the reading region includes a plurality of the original document images,
generating, as the basic display data, data for producing, in the preview region, a preview display of an image in the all parts of the reading region including the original document images,
producing the preview display based on the generated basic display data and
receiving a specification operation for specifying any one of the original document images; and
a step of, when the specification operation is performed, setting, to a target image, the original document image specified by the specification operation among the original document images,
generating, as the enlargement display data, data for producing, in the preview region, a preview display of the target image whose display size is enlarged as compared with the target image produced as the preview display in the preview region based on the basic display data and
producing the preview display based on the generated enlargement display data,
wherein an aspect ratio of the preview region is changed according to the size of the reading region.

8. The method according to claim 7, wherein the plurality of original documents are read simultaneously.

* * * * *